United States Patent [19]

Lomasney et al.

[11] Patent Number: 4,924,630
[45] Date of Patent: May 15, 1990

[54] FUNCTIONAL DOOR CARTRIDGE AND METHOD OF MANUFACTURING THEREOF

[75] Inventors: David J. Lomasney, Marine City; Robert H. Dietze, Bloomfield Hills, both of Mich.; Jeffrey D. Rohrback, Fairfield Glade, Tenn.

[73] Assignee: Hoover Universal, Inc., Ann Arbor, Mich.

[21] Appl. No.: 349,283

[22] Filed: May 8, 1989

Related U.S. Application Data

[63] Continuation-in-part of Ser. No. 177,765, Apr. 5, 1988.

[51] Int. Cl.$^5$ ............................................. B60J 5/04
[52] U.S. Cl. ....................................... 49/502; 296/146
[58] Field of Search .......................... 49/502, 503, 372; 296/146, 188

[56] References Cited

U.S. PATENT DOCUMENTS

| | | | |
|---|---|---|---|
| 4,307,911 | 12/1981 | Pavlik | 296/188 |
| 4,416,088 | 11/1983 | Feucht et al. | 49/502 |
| 4,662,115 | 5/1987 | Ohya et al. | 49/503 |
| 4,764,735 | 1/1989 | Batchelder et al. | 49/503 |

FOREIGN PATENT DOCUMENTS 2191156 12/1987 United Kingdom .

OTHER PUBLICATIONS

Automotive Engineer, "Component Perspective", Modular Door Systems, Jun./Jul., 1987, pp. 64, 65.
Assembly Engineering, "Mod Product to Simplify Auto Assembly", Mar., 1988, p. 8.
YMOS AG Publication, "Developments, Processings, Products, The New Door Concept from YMOS".

*Primary Examiner*—Kenneth J. Dorner
*Assistant Examiner*—Gerald A. Anderson
*Attorney, Agent, or Firm*—E. L. Levine

[57] ABSTRACT

A functional door cartridge for use in a motor vehicle door assembly is disclosed. The cartridge consists of a skeleton frame forming the general outline of a door. A portion of the frame also serves as glass guides for the window glass. Another portion of the frame serves as a guide for the window regulator lift plate. All moving components of the door assembly such as the window, door latch, window regulator, interior and exterior door handles and latch rods are mounted to the functional door cartridge which can be assembled in a horizontal position rather than the typical upright position used to assemble doors. After assembly, all functions of the door are fully tested before the door cartridge is inserted into an exterior door panel to complete the door assembly. In one embodiment the cartridge is pivoted about mounting studs to facilitate proper alignment with the door panel.

5 Claims, 13 Drawing Sheets

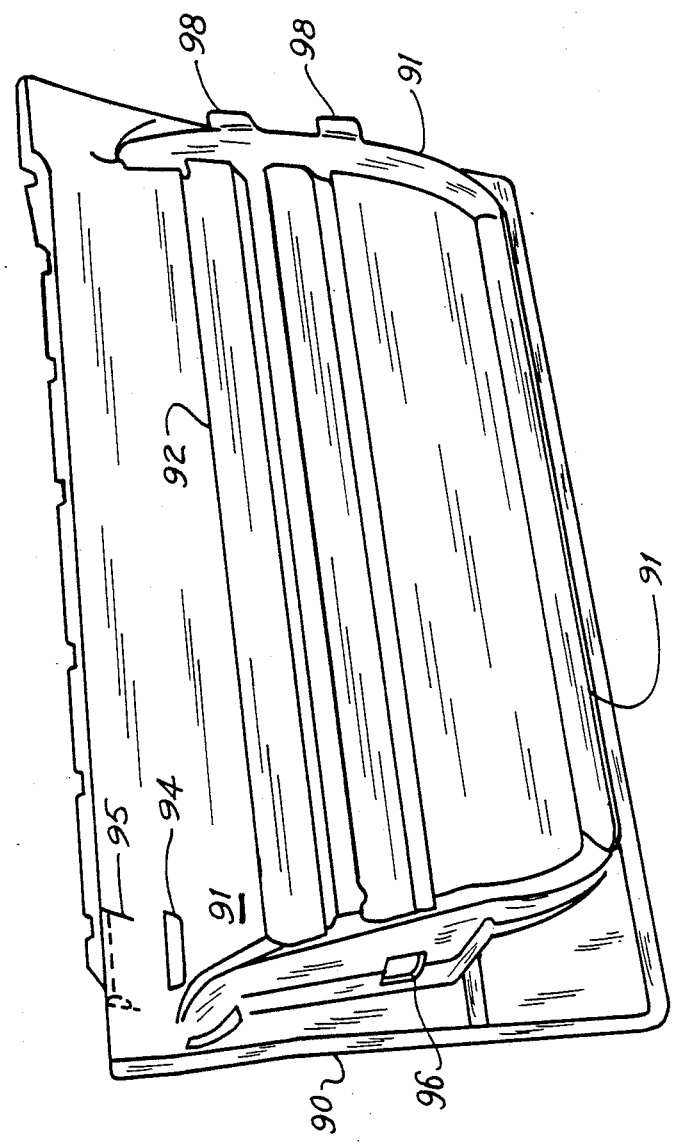
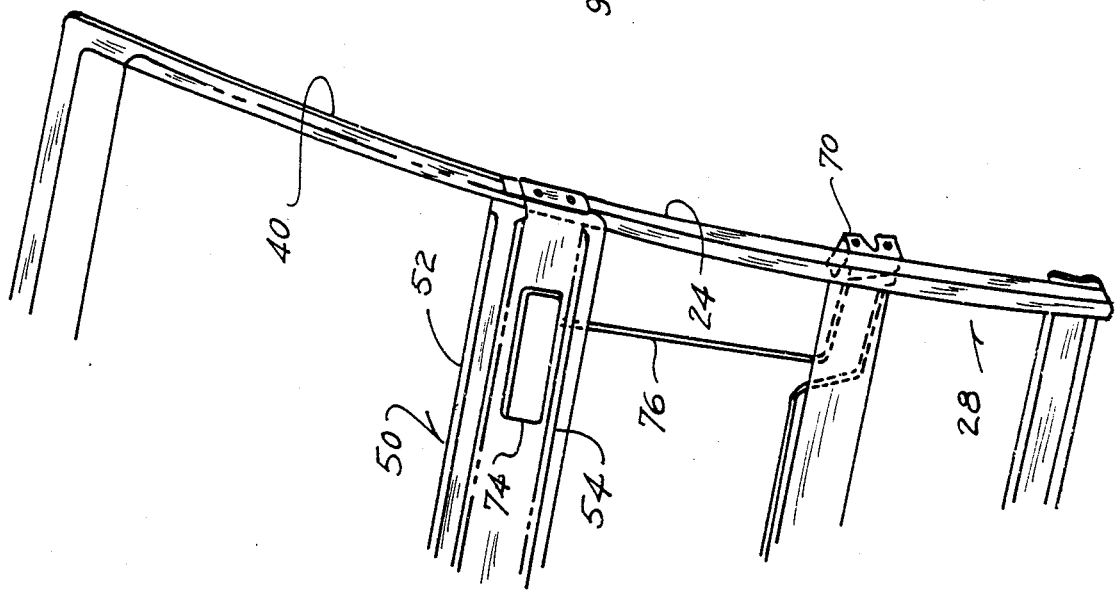
FIG. 6
FIG. 5

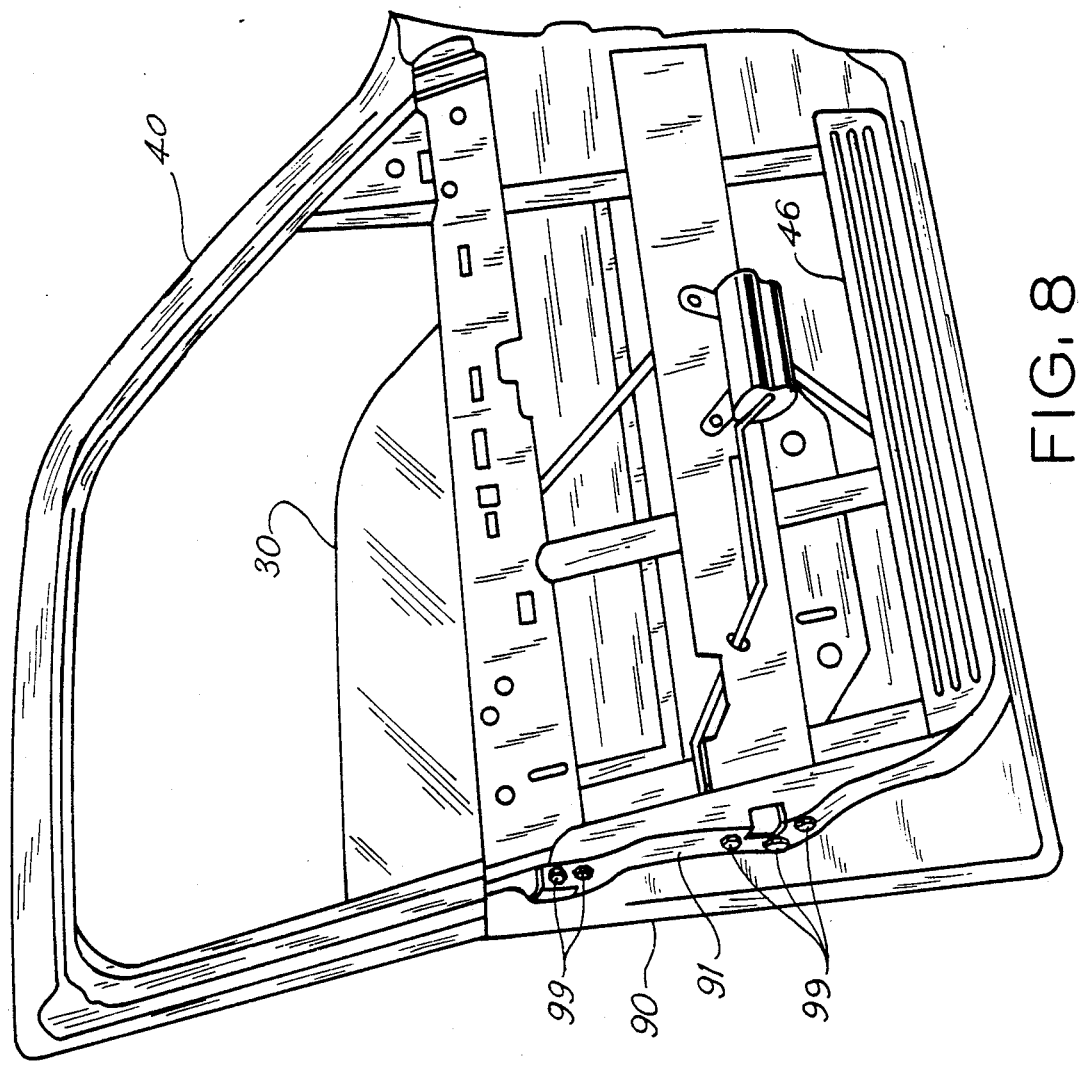

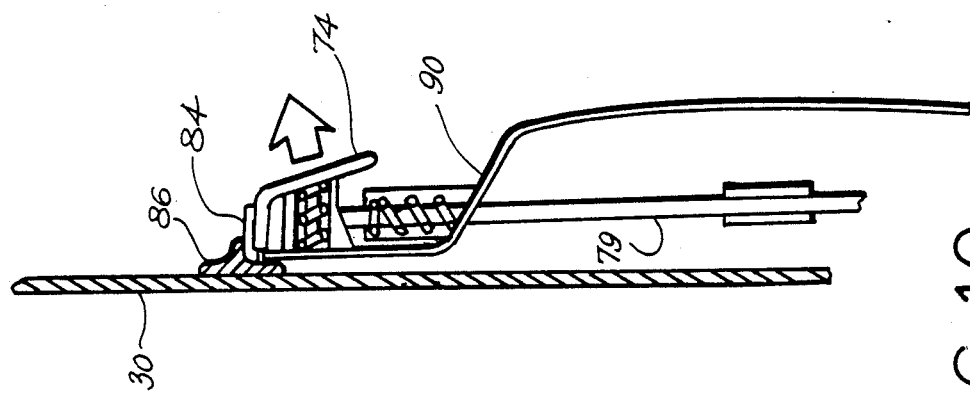
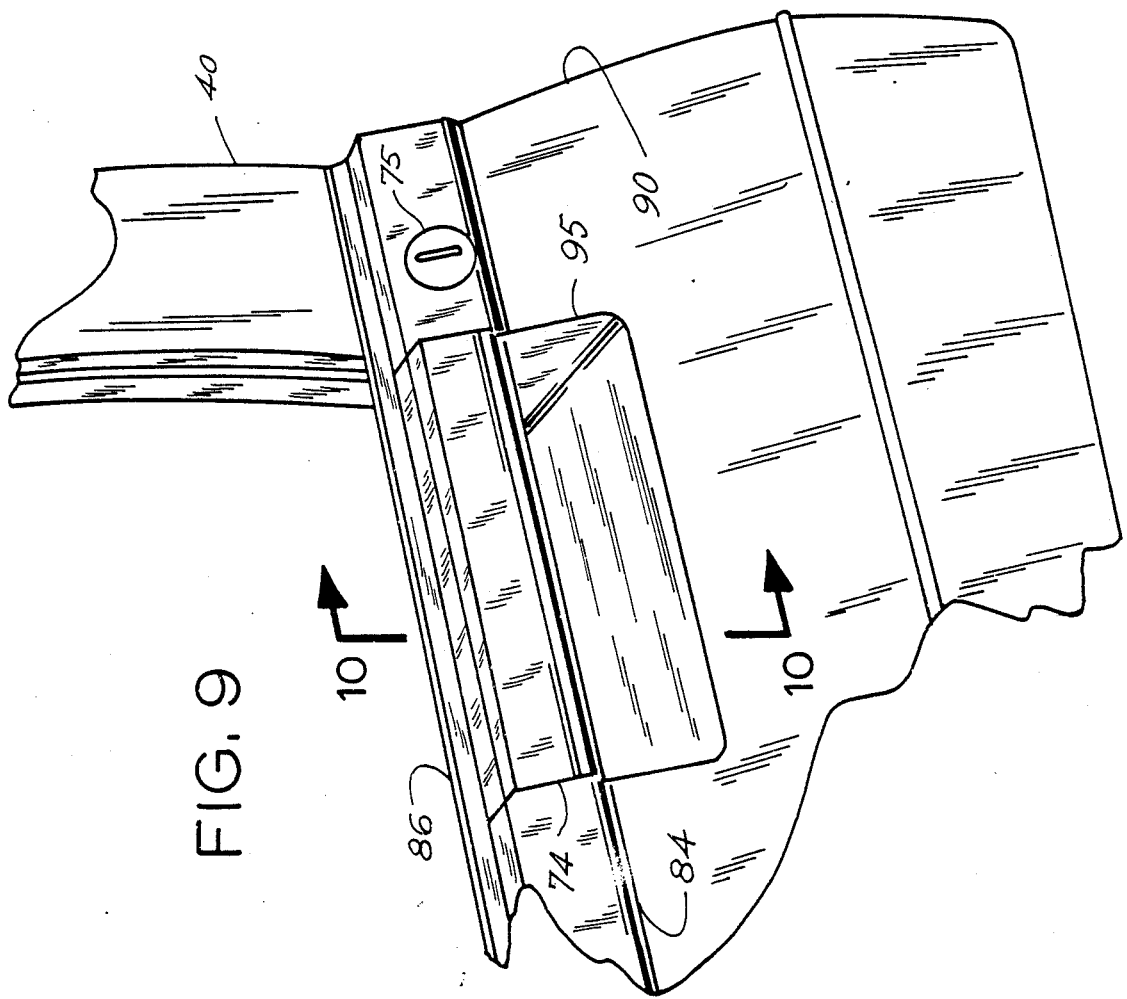

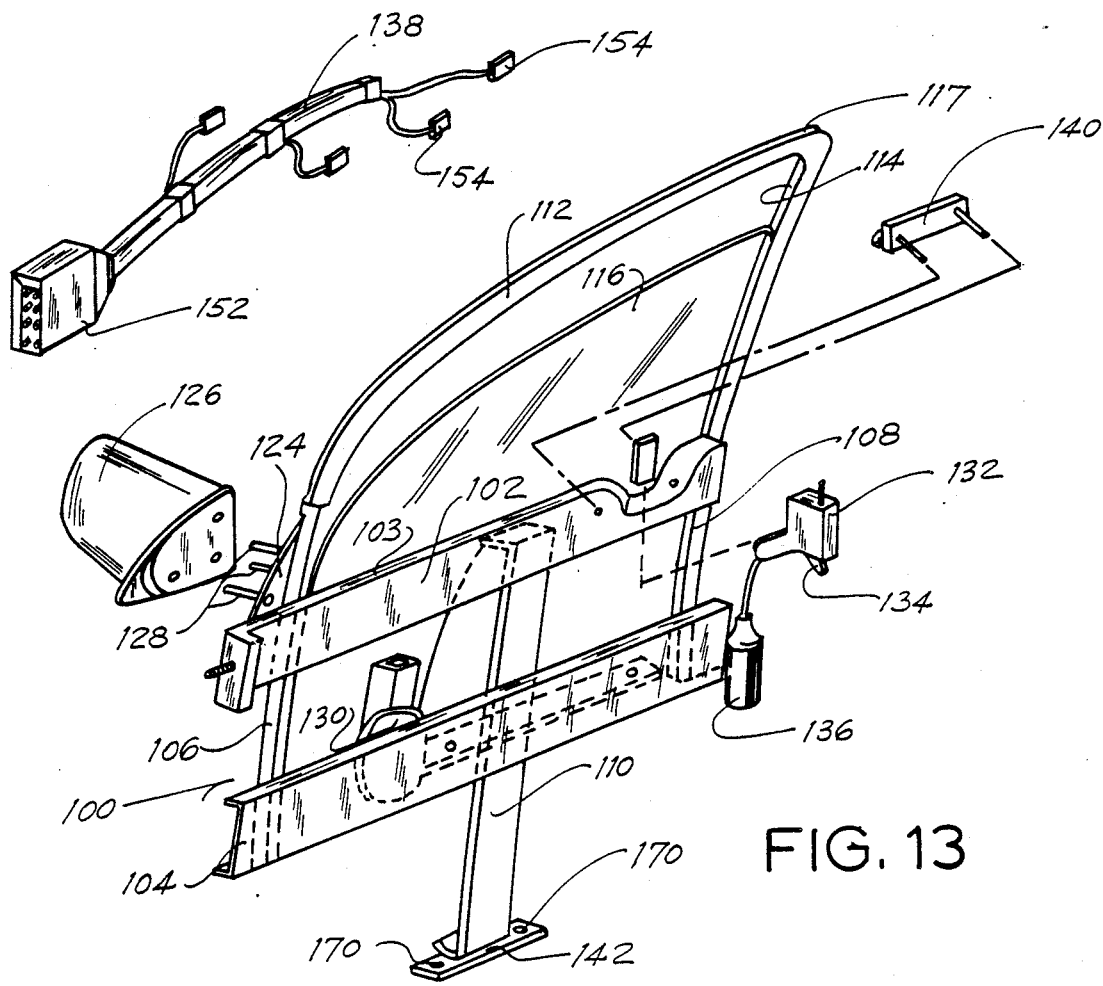
FIG. 13
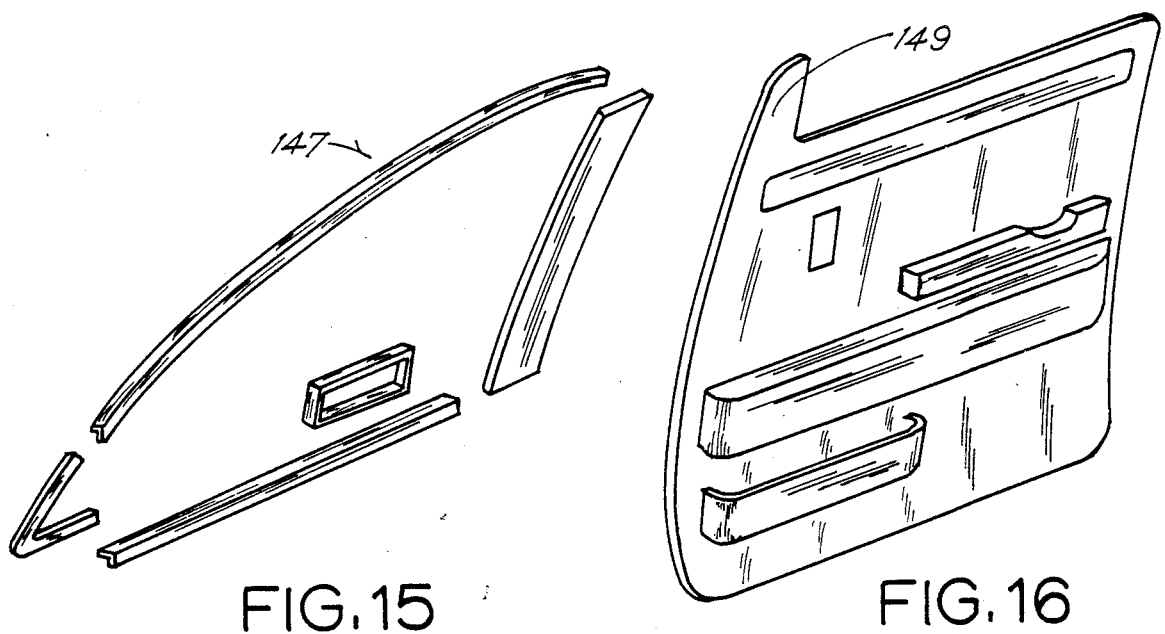
FIG. 15
FIG. 16

FUNCTIONAL DOOR CARTRIDGE AND METHOD OF MANUFACTURING THEREOF

BACKGROUND OF THE INVENTION

This application is a continuation-in-part of U.S. application Ser. No. 177,765 filed Apr. 5, 1988 now pending entitled "Functional Door Cartridge and Method of Manufacturing Thereof", assigned to a common assignee.

This invention relates to door assemblies for use in motor vehicles and more particularly to a functional door cartridge consisting of a structural frame and functional door components so that the cartridge can be pre-assembled and tested and mounted in place on the finished vehicle in mated relation with the usual outer door panel.

Conventional vehicle doors are made by stamping from sheet steel an inner panel and an outer panel. Each of these panels has multiple openings formed in it, and each opening represents a significant volume of scrap steel. The largest opening is for the window. The other openings, particularly in the inner panel, are required in order to enable to assembly of various components in the door in the space between the two panels. These components include the latch mechanism, interior and exterior door handles with control rods to connect the handles to the latch mechanism, window glass, window regulator and window glass guides. Other accessories can be added such as power door locks, etc. Additionally, the assembly operations are performed while the door is in an upright position. The assemblers must work against the force of gravity while installing these components.

A completed door assembly may have as many as one hundred separate parts, supplied by several different suppliers, each of which must be tracked by the vehicle manufacturer. The number of components installed in a door assembly is rapidly making the door assembly one of the most complex components of a motor vehicle.

With only a limited amount of space between the two door panels it is becoming more difficult to install the components into the door as well as to service these components later. A door assembly which produces less scrap in production, is easier to assemble and service and reduces the total number of parts to be tracked by the vehicle assembler, while at the same time maintaining the same functions and features of current doors is needed.

Accordingly, it is an object of this invention to provide a vehicle door assembly, the manufacture of which reduces the amount of steel scrap.

It is a further object of this invention to reduce the total number of components in a door assembly and also to reduce the number of components tracked by the vehicle assembler at the assembly plant.

It is yet another object of this invention to provide a door assembly which can be assembled in a horizontal position such that the assembler does not work against the force of gravity.

It is a feature of this invention to provide a skeleton or reticulated door frame structure which has all of the moving door components mounted thereto.

It is a further feature of this invention to provide a skeleton door frame in which the frame itself serves as a regulator and guide for the window glass.

It is an advantage of this invention that all moving components of the vehicle door assembly can be fully function tested after assembly of the door cartridge prior to final assembly of the door.

SUMMARY OF THE INVENTION

The present invention consists of a functional door cartridge which includes all the moving components of the door assembly. After assembly of the door cartridge, all moving components can be fully function tested. After completion, the door cartridge is then shipped to the vehicle assembler who then completes the door assembly by installing the functional door cartridge into an outer door panel and installing the final trim.

In one embodiment the functional door cartridge comprises a number of skeletal frame members interconnected so as to define the outline of a door. The frame includes forward and rearward and intermediate vertical members, a lower cross member, a belt line cross member and an intermediate cross member, all of which are interconnected. An upper door frame which forms the outline of the window section of the door is installed at the top of the belt line cross member. The upper door frame can be omitted for door assemblies used in convertible vehicles. In other embodiments, the upper door frame can be included as an outer portion of the outer door panel as opposed to the functional door cartridge. In yet another embodiment there are two cross members, one at the belt line and one below, and one of the vertical members extends below the cross members for attachment to the bottom sill of the outer door.

In addition to serving as structural members, the forward and rearward vertical frame members also serve as channel guides for the window glass. The intermediate vertical frame member also serves as a channel guide for the window glass attaching bracket and lift plate portion of the window regulator. By combining the glass guide and regulator functions into the structural members, the total number of components in the door assembly is reduced.

The functional door cartridge is "designed for assembly" meaning that ease in assembly is a primary design consideration. The door cartridge can be assembled using fixtures on a horizontal work station. This eliminates the need for working against gravity while installing the components into the functional door cartridge. This results in increased ease in assembling the door cartridge which also improves the reliability of the cartridge assembly. Once assembled, all of the moving components of the door assembly can be fully function tested prior to shipment of the door cartridge to the vehicle assembler. Once shipped to the assembly plant, the door cartridges are mated with the outer door panel and final trim is added. The door assembly is then mounted to the vehicle as the vehicle leaves the assembly line. The cartridge can also be mounted to a door assembly mounted to the vehicle, preferably after painting of the vehicle. The functional door cartridge includes an electrical wire harness which can be plugged into the vehicle wiring harness.

BRIEF DESCRIPTION OF THE DRAWINGS

Various advantages of the present invention will become apparent to one skilled in the art upon reading the following specification and the references to the following drawings in which:

FIG. 5 is a perspective view of a functional door cartridge showing exterior door handle;

FIG. 6 is a perspective view of the door panel which mates with the door cartridge, showing the interior side of the door panel;

FIG. 8 is a perspective view of the door cartridge as installed in the door panel;

FIG. 9 is a perspective view of the completed door assembly showing the exterior door handle and lock;

FIG. 10 is a cross section of the door handle as seen from substantially the line 10—10 in FIG. 9;

FIG. 13 is a perspective view of a door cartridge in accordance with another embodiment of the invention;

FIG. 15 is an expanded perspective view of outer trim components for the door panel of FIG. 14;

FIG. 16 is a perspective view of an inner trim panel for the door panel of FIG. 14;

DESCRIPTION OF THE PREFERRED EMBODIMENTS

Figure 1:
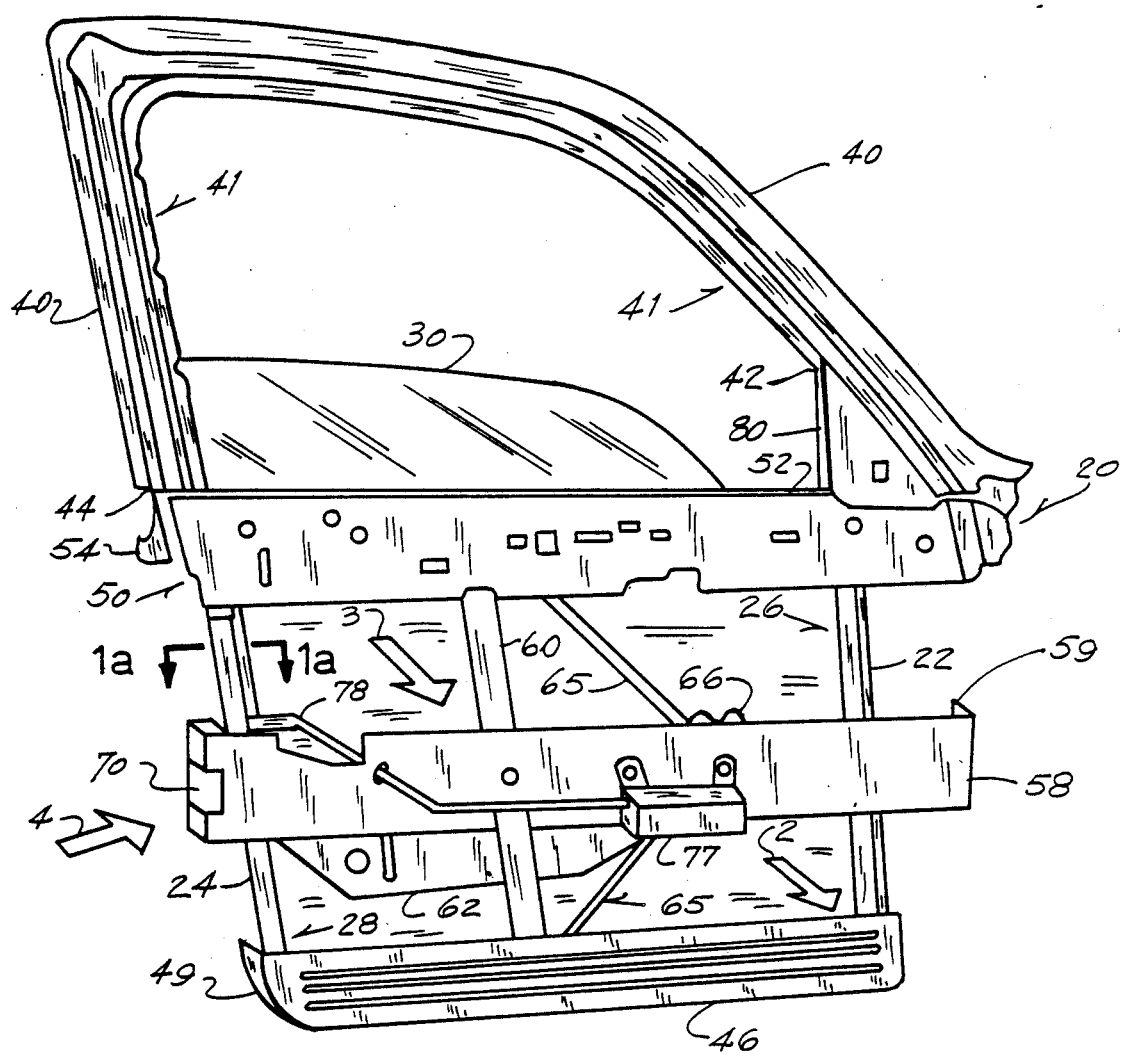
FIG. 1 a perspective view of the functional door cartridge.

One embodiment of the functional door cartridge of this invention is shown in FIG. 1 and indicated generally at 20. This figure shows the interior side of a functional door cartridge for use in a driver's side front door of a motor vehicle. The terms interior, exterior, rearward and forward as used in this description are related to the door cartridge as installed in a vehicle.

The functional door cartridge includes a forward vertical or upright frame member 22 and a rearward vertical frame member 24. Frame members 22 and 24 are roll formed or stamped as are all other structural members used in the functional door cartridge. Frame members 22 and 24 are of a "C" channel construction, having channel features 26 and 28 respectively. The channel section 26 of forward vertical frame member 22 is directed rearward while the channel section 28 of the rearward vertical frame member 24 is directed forward. Channel sections 26 and 28 serve as guides for the window glass 30, window glass 30 being movable up and down in these channels.

Figure 1A:
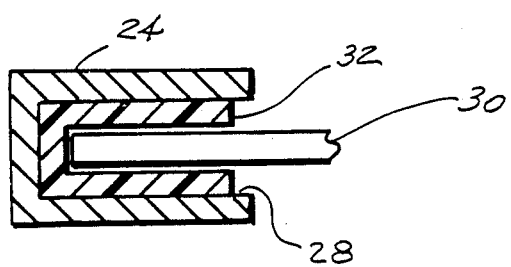
FIG. 1a is a cross section of the rearward vertical frame member as seen from substantially the line 1a—1a in FIG. 1.

Window seals 32 are included in channels 26 and 28. FIG. 1a is a cross section of vertical frame member 24 showing the glass 30 mounted in the seal 32 in channel 28. Integration of the window guide into the door frame structure eliminates the need for separate window guides mounted to the inner door panel as used in current door construction. This results in a reduction of the number of separate components in the door assembly and reduces the weight of the door assembly.

An upper door frame 40 is connected to the upper end of forward vertical frame member 22 generally at 42 and to the upper end of rearward vertical frame member 24 at 44. In alternative designs as discussed below, the upper door frame may be a part of the outer door panel or may be deleted altogether for convertible vehicle doors. Upper door frame 40 includes a channel 41 for guiding and retaining the window glass 30. Channel 41, like channels 26 and 28, includes a window seal.

Figure 2:
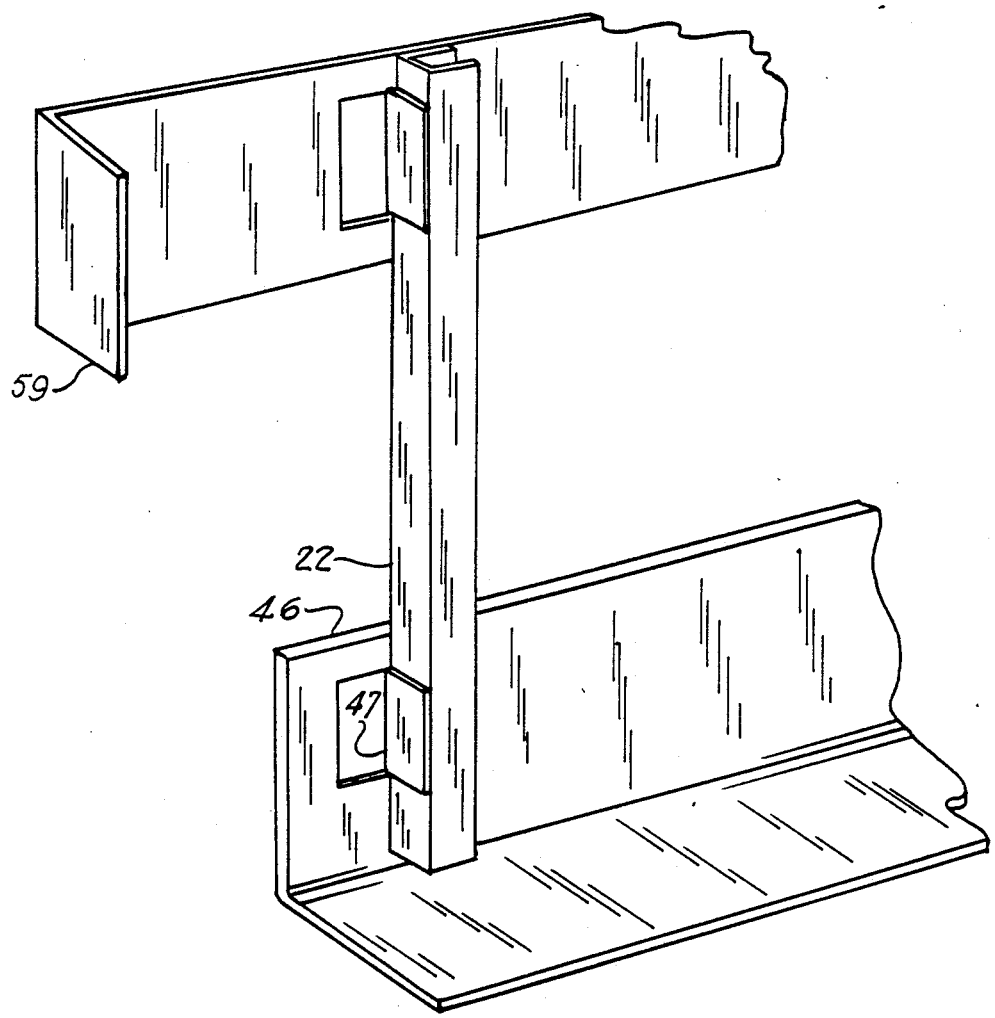
FIG. 2 is a perspective view of a portion of the door cartridge in the direction of arrow 2 of FIG. 1, showing the construction of the joints between the vertical and horizontal cross members.

A lower cross member 46 defines the bottom of the functional door frame and is mounted to the lower end of the vertical frame members. FIG. 2 is a view in the direction of arrow 2 which shows in detail the manner in which lower cross member 46 is joined to the vertical frame members. A tab 47 is struck out of lower cross member 46 and bent out at approximately a right angle and is welded to vertical support member 22. Any secure attachment method which can withstand the vehicle environment may be used.

Referring to FIG. 1, a belt line cross member is shown generally at 50 and defines the lower edge of the window opening. The cross member 50 includes two members, an interior member 52 mounted to the inside of the vertical frame members and an exterior member 54 mounted to the outer side of the vertical frame members. The window glass 30 passes between members 52 and 54.

An intermediate cross member 58 is located generally midway between the lower cross member 46 and the belt line cross member 50. The exact location will vary depending on the desired location of various functional components mounted to the intermediate cross member 58. All connections of the cross members to the vertical members are formed in the manner shown in FIG. 2.

An intermediate vertical frame member 60 is located between the forward and rearward vertical frame members 22 and 24 and is attached to the three cross members 46, 50 and 58 in the manner previously described. Vertical member 60 is a "C" channel structural member with a channel feature 61 facing the exterior. In addition to being a structural member, member 60 serves as a portion of the window regulator, further reducing the total number of components. The window regulator is shown in FIG. 3 which is a view in the direction of arrow 3.

Figure 3:
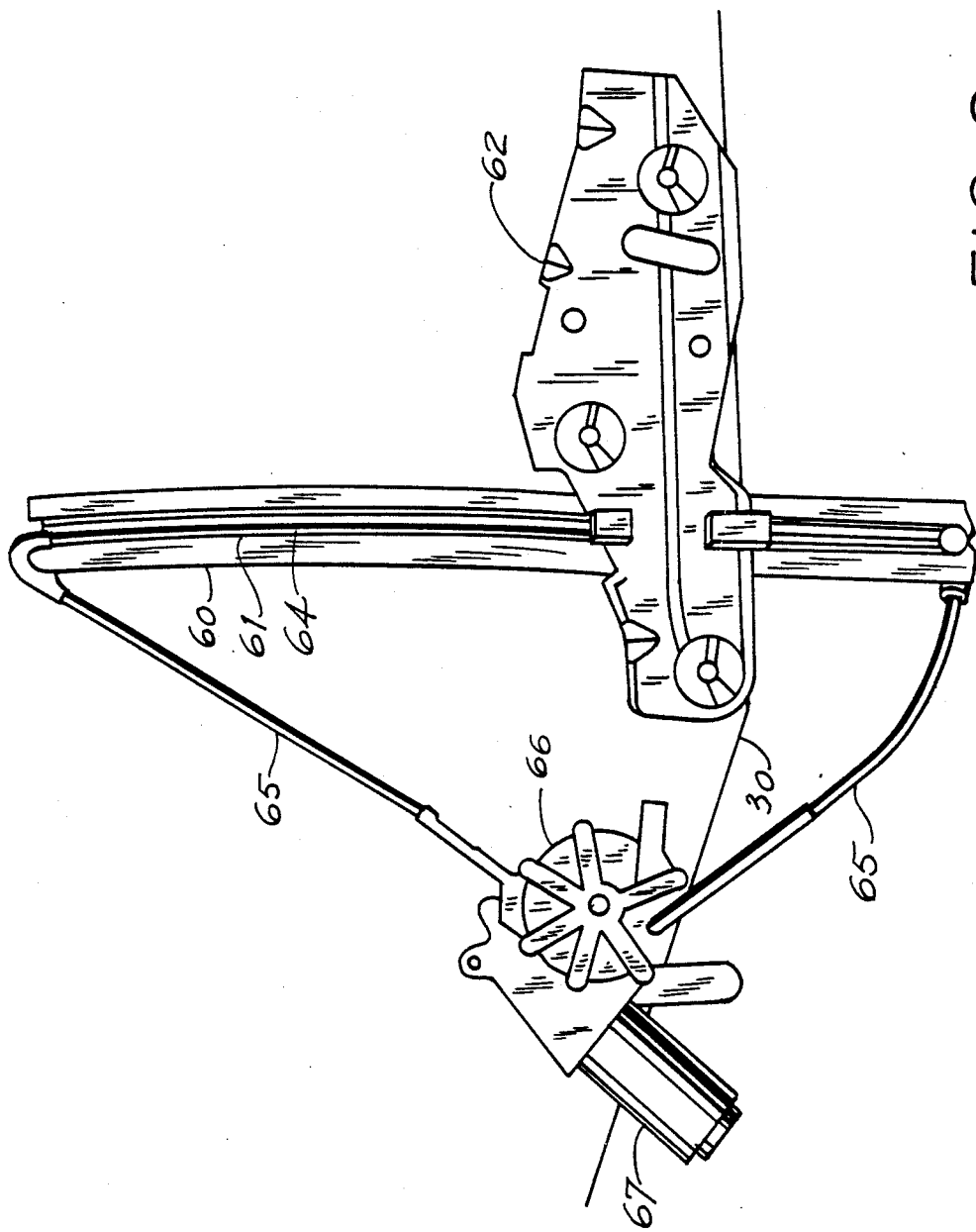
FIG. 3 is a perspective view of the door cartridge in the direction of arrow 3 of FIG. 1, showing the window regulator.

FIG. 3 shows the window regulator used to raise and lower the window glass 30. Channel 61 guides the motion of glass attaching bracket and lift plate 62. Plate 62 is raised and lowered by cable 64 which passes through channel 61. Cable 64 travels through cable shields 65 attached to each end of channel 61 and is wound around the drum of drum assembly 66. Drum assembly 66 is mounted to the exterior side of intermediate cross member 58 not shown in FIG. 3. Drum assembly 66 can be equipped with an optional motor 67 for power window operation. For manual operation, drum assembly 66 is adapted for the attachment of a window crank.

Figure 4:
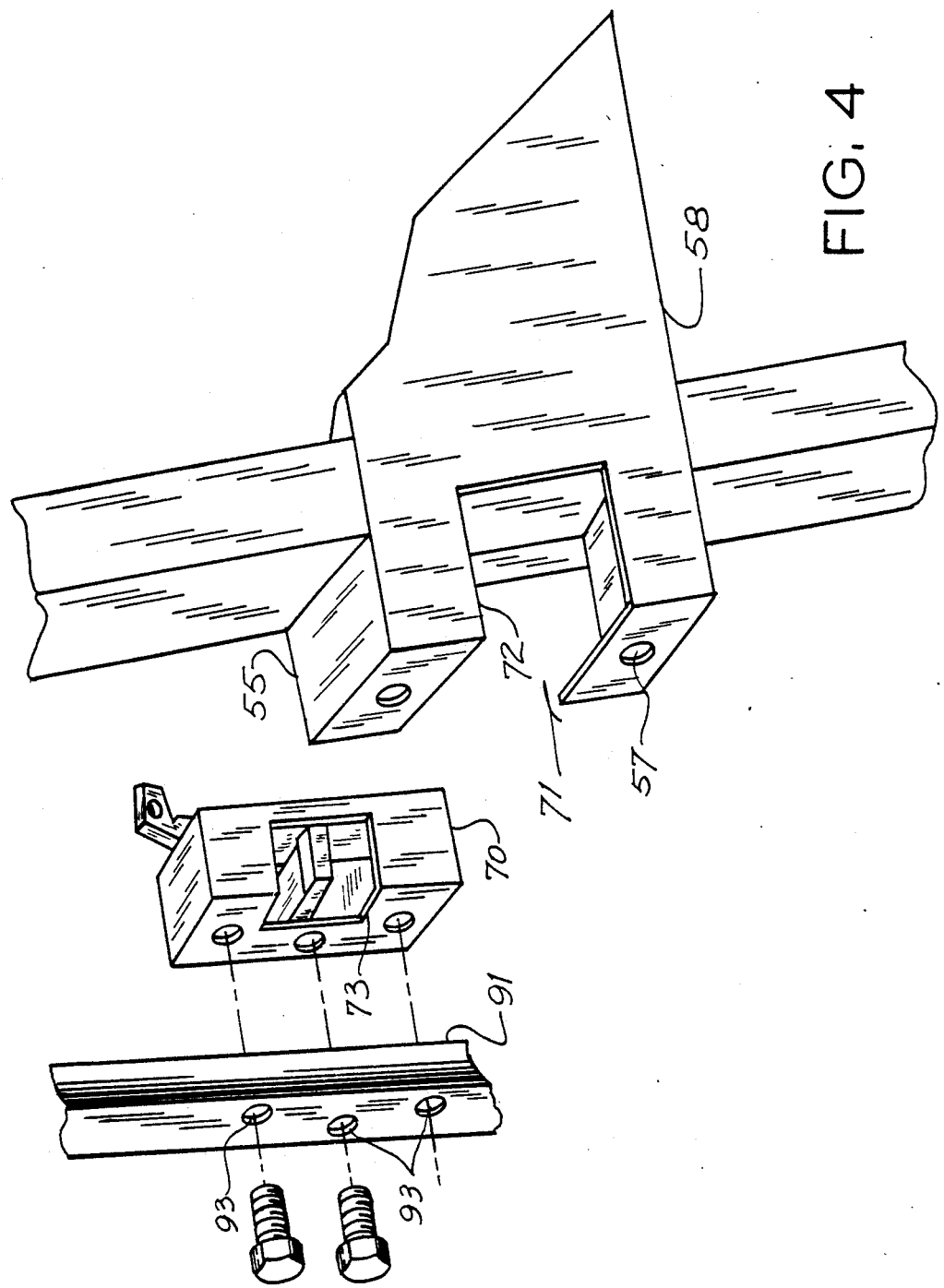
FIG. 4 is a perspective view of the door cartridge in the direction of arrow 4 in FIG. 1 showing the door latch mechanism assembly.

A self locating door latch assembly 70 is mounted to the rearward end of intermediate cross member 58 for latching the door assembly in a closed position. FIG. 4 is a view in the direction of arrow 4, in FIG. 1, showing an enlarged view of the latch mounting. The end of cross member 58 includes a latch mounting pocket 71. Latch 70 is held loosely into pocket 71 by friction fit between upper rail 55 and lower rail 57 of the cross member 58. When the functional door cartridge is mounted in the outer door panel, the horse collar 91 of the door panel is bolted to the latch assembly through holes 93. The friction fit into pocket 71 allows location of the latch for proper alignment with horse collar 91. Opening 73 of latch 70 is aligned with opening 72 in cross member 58 to provide clearance for the latch post to enter the latch.

FIG. 5 shows the exterior door handle assembly 74 mounted to the exterior of belt line cross member 50. The handle will extend through an opening in the door panel when assembled. Rod 76 interconnects the handle 74 to latch 70 to allow remote operation of the latch from the door exterior to open the door.

Referring to FIG. 1, an interior door handle 77 is mounted to intermediate cross member 58. A rod 78 interconnects the interior handle with latch 70 for remote operation of the latch from inside the vehicle.

A mirror assembly 80 is mounted to the generally triangular-shaped "sail" bracket between the upper door frame 40, belt line cross member 50 and vertical member 22. Mirror assembly 80 includes an adjustable rear view mirror on the exterior of the door assembly.

Once the functional door cartridge has been assembled, all door operations can be fully function tested to ensure proper operation. This includes the latch, handles, and window regulator. Proper glass alignment and seal installation can also be checked.

FIG. 6 shows an inner side of door panel 90 into which the functional door cartridge is mounted. Intrusion beam 92 is attached to the door panel to provide required occupant protection in the event of a side impact collision. The door panel also includes generally U-shaped horse collar 91. Collar 91 is made of sheet steel and extends inwardly from the door panel. Door hinges 98 are attached to the forward side of horse collar 91 for mounting of the door assembly to the vehicle. The rearward edge of the horse collar has an opening 96 for reception of the door latch striker into the door latch 70. Opening 94 is for the exterior door handle 74, as shown in FIG. 5, to extend through. The phantom lines at 95 show an alternative design where the exterior door handle is at the top edge of the door panel and at the top of the belt line cross member as will be discussed below in conjunction with FIG. 9.

Figure 7:
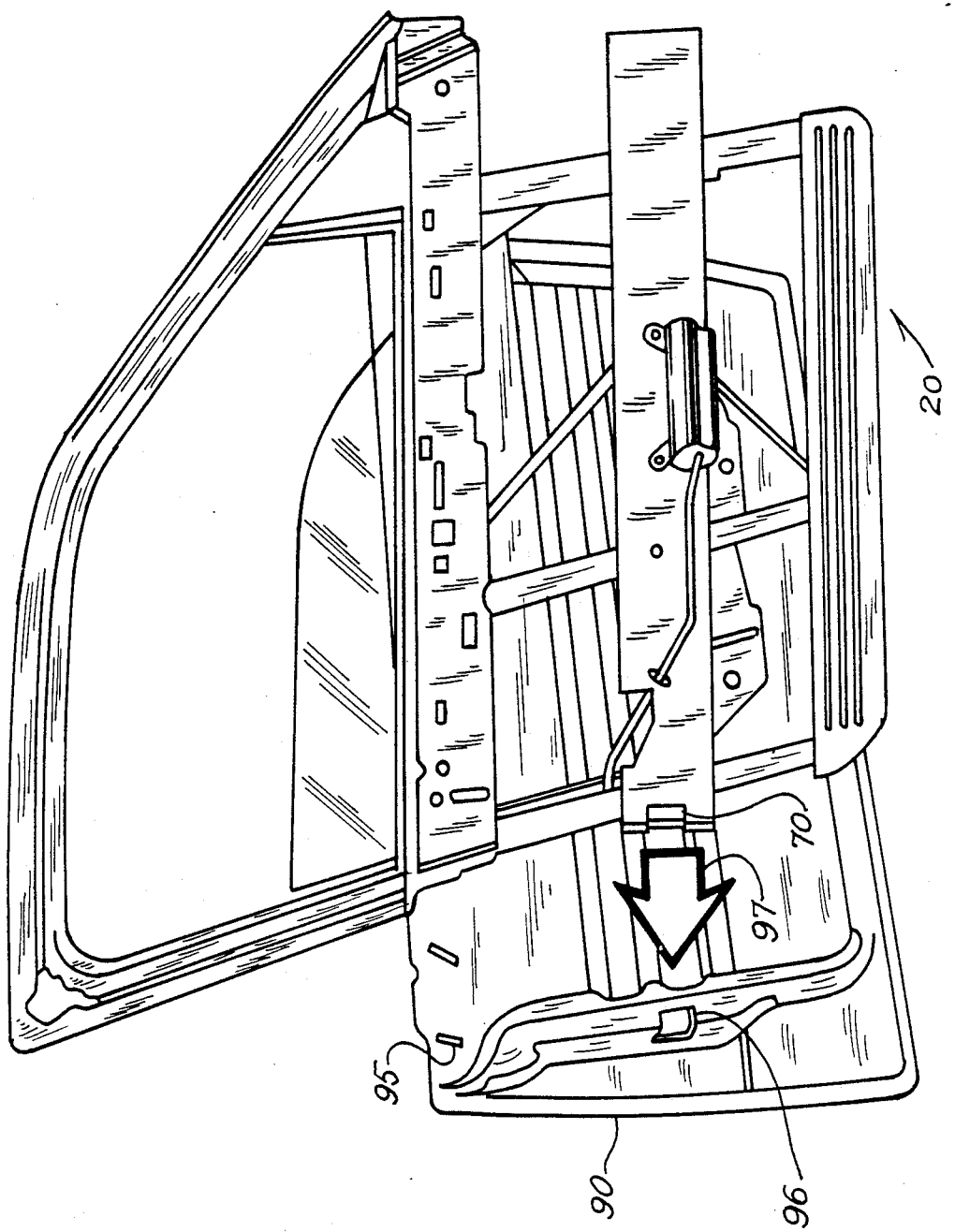
FIG. 7 is a perspective view of the functional door cartridge showing the mating of the door cartridge with the door panel.

The completed functional door cartridge is shipped to the automotive assembly plant where it is mated in a painted door panel 90 provided by the automobile manufacturer. Referring to FIG. 7, the cartridge is mounted into the door panel by inserting the rearward edge of the cartridge into the rear section of the horse collar as shown by arrow 97. The door latch 70 is aligned with opening 96 in the horse collar while the exterior door handle and the door handle opening in the door panel are aligned. The forward end of the door cartridge is then pushed into place. The functional door cartridge is supported in and bolted to the horse collar. The cross member ends include mounting flanges, such as flange 49 on the rearward end of cross member 46 and flange 59 on the forward end of cross member 58 as shown in FIG. 1, for bolting the functional door cartridge to the horse collar. Design considerations may prevent bolting each cross member end to the horse collar such as the door latch installed in the end of cross member 58. It is preferred to attach as many cross member ends as is possible to the horse collar.

FIG. 8 shows a functional door cartridge as installed in a door panel including a portion of the bolts 99 used to bolt the cross members to the door panel horse collar.

FIG. 9 shows the exterior handle of the completed door assembly. This embodiment shows the door handle 74 mounted at the top of door panel 90. A belt line trim strip 84 is attached to the upper edge of the belt line cross member 54 to provide a finished appearance at the bottom of the window. Trim strip 84 includes a window seal 86.

FIG. 10 shows a schematic cross section of the handle mechanism 74 including the trim strip 84 and window seal 86. Also shown is the door handle lock rod 79 which connects the door lock 75 to the latch mechanism 70 in any conventional manner. This mechanism allows opening of the door latch from the exterior when required.

Figure 11:
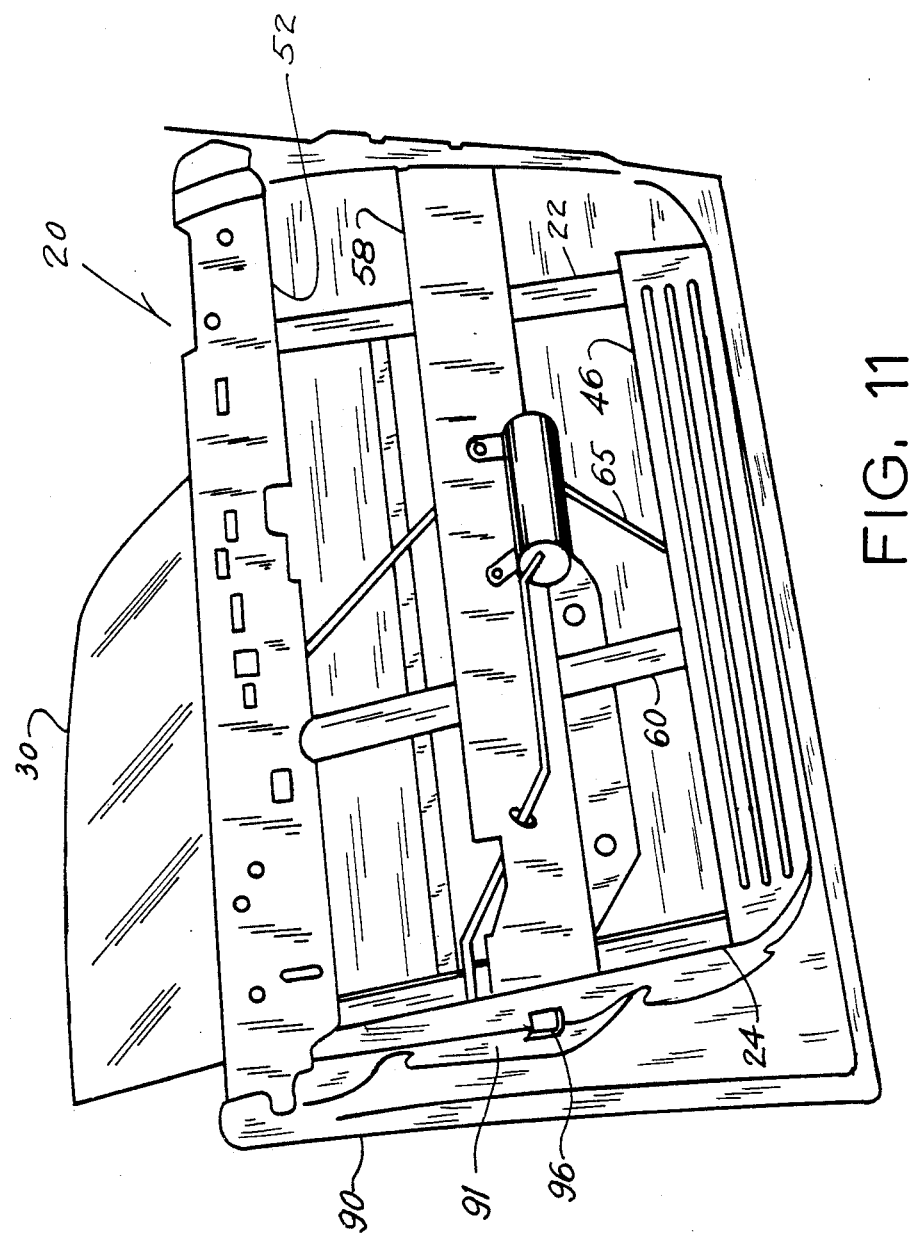
FIG. 11 is a perspective view of the door cartridge installed in a door panel for use in a convertible vehicle.
Figure 12:
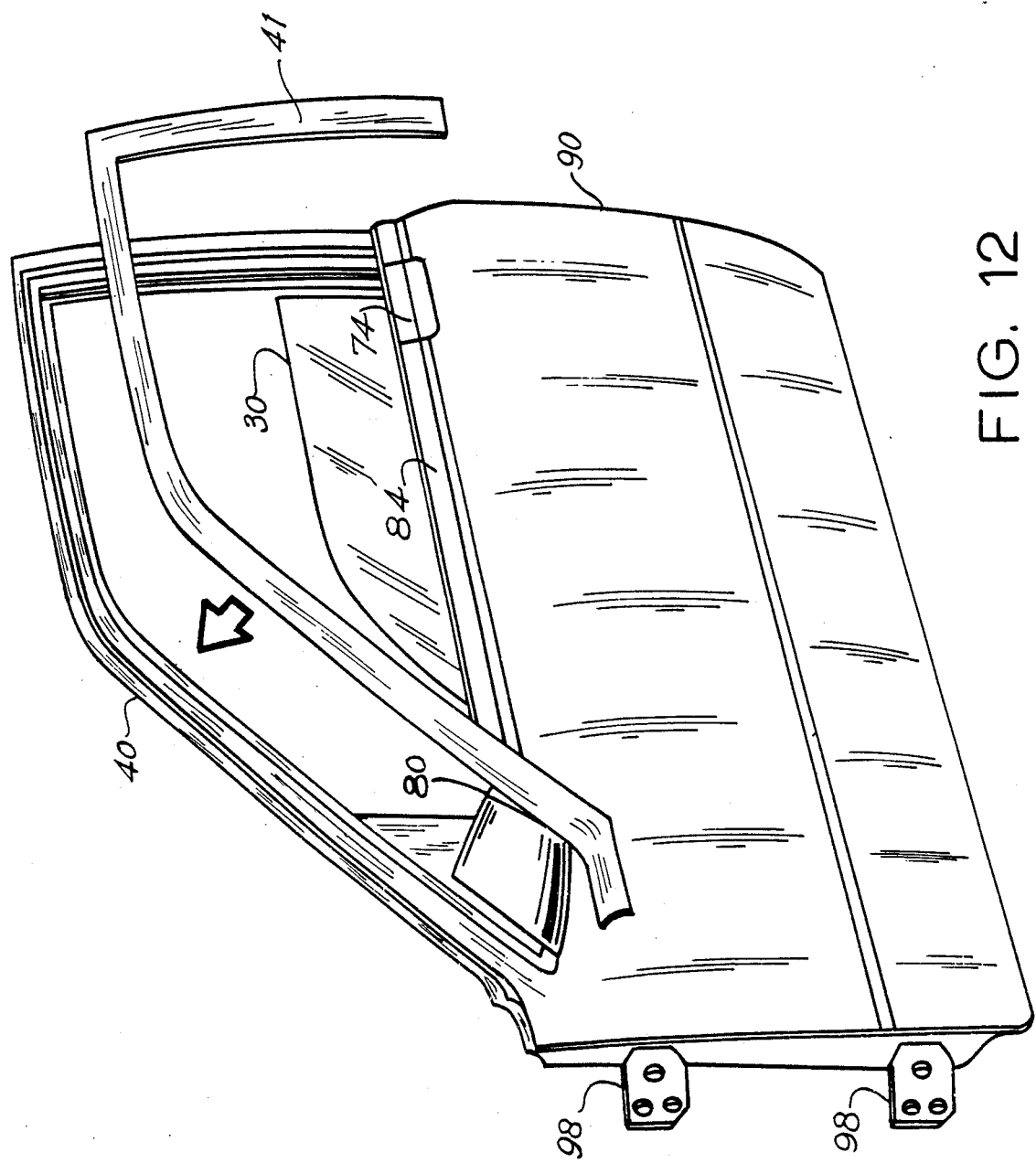
FIG. 12 is a perspective view of the exterior of a door assembly showing an optional plastic finish panel for the upper door frame.

FIG. 11 illustrates a completed door assembly for use with a convertible vehicle. The door cartridge 20 is identical to the cartridge used for non-convertible vehicles except the upper door frame is omitted. There are several options regarding the construction of the upper door frame. If desired, it can be included as a portion of the door panel 90 instead of being a part of the functional door cartridge 20 as shown in FIG. 1. In this case, the door cartridge would be the same as the cartridge used with convertible vehicles as shown in FIG. 11. With the design shown in FIG. 1, the exterior of the upper door frame 40 can be styled and finished to match the vehicle exterior or an outer plastic finish panel 41 can be installed over the upper door frame as shown in FIG. 12.

Figure 17:
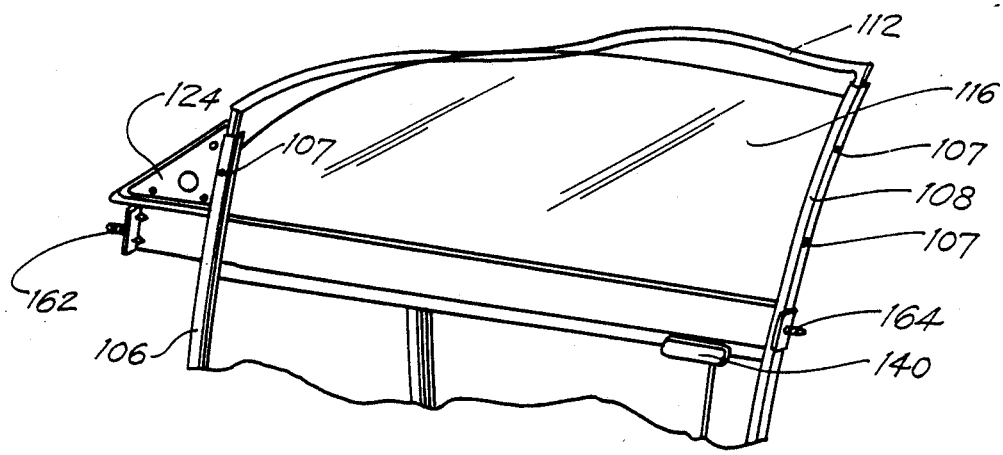
FIG. 17 is a perspective view, similar to FIG. 13, showing particularly pivotal attachment studs.

Yet another embodiment is shown in FIGS. 13 through 20. Here a functional door cartridge 100 includes a belt line cross member 102 and a lower cross member 104. The belt line cross member 102 has a top edge 103. Interconnected to the cross members 102, 104 are an upright forward frame member 106, a rearward frame member 108 and an intermediate frame member 110. The frame members 106, 108 extend upwardly from the lower cross member 104, and the intermediate frame member 110 extends below the lower cross member 104. The intermediate frame member 110 includes a lower surface or plate 142 for purposes to be described hereinafter. The forward frame member 106 and rearward frame member 108 may extend upwardly to, and terminate at, the belt line cross member 102. Alternatively, one or both of the frame members 106, 108 may extend above the top edge 103 of the belt line cross member 102. The frame members 106, 108 have attachment openings 107 (FIG. 17).

Figure 14:
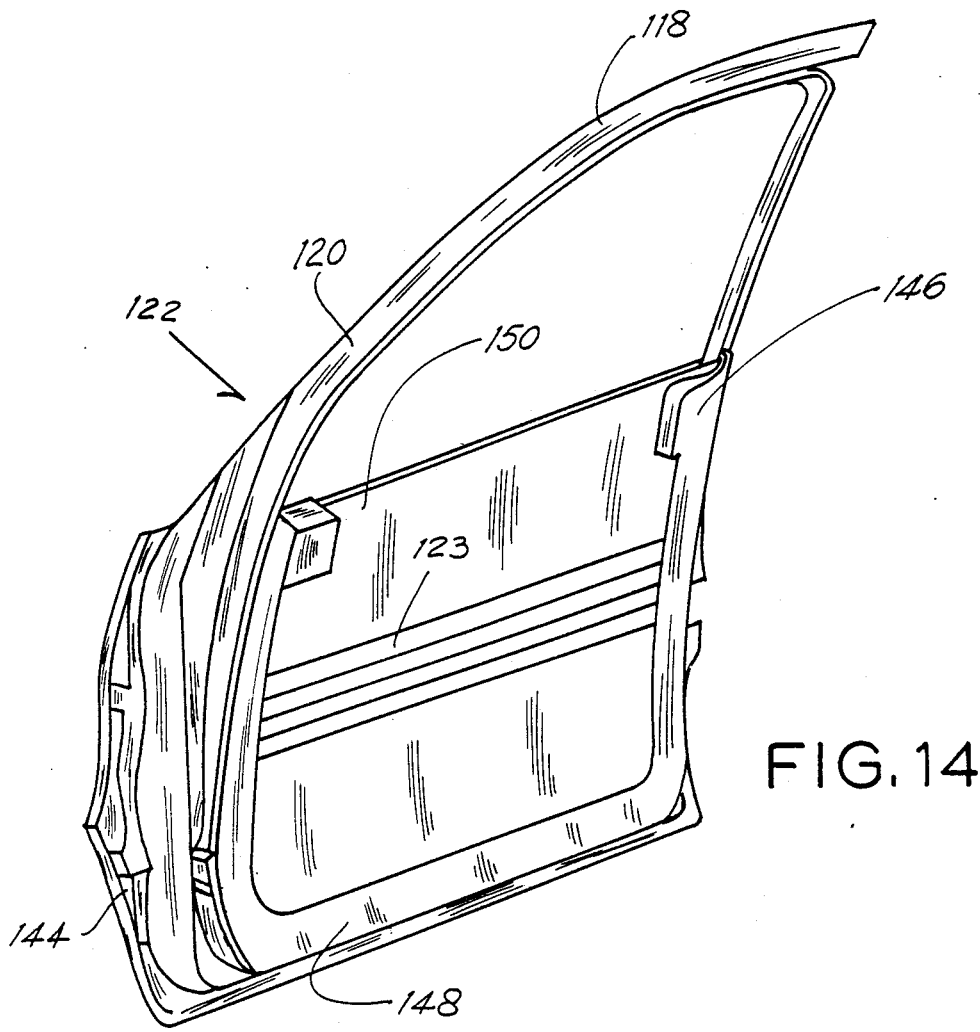
FIG. 14 is a perspective view of a full stamped exterior door panel for receiving the cartridge of FIG. 13.
Figure 20:
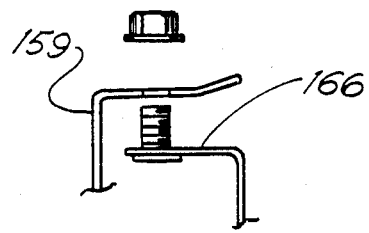
FIG. 20 is a broken top view of the bracket of FIG. 19 and related components.
Figure 19:
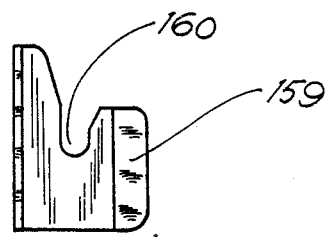
FIG. 19 is a view of a reinforcement bracket taken at 19—19 of FIG. 18.
Figure 18:
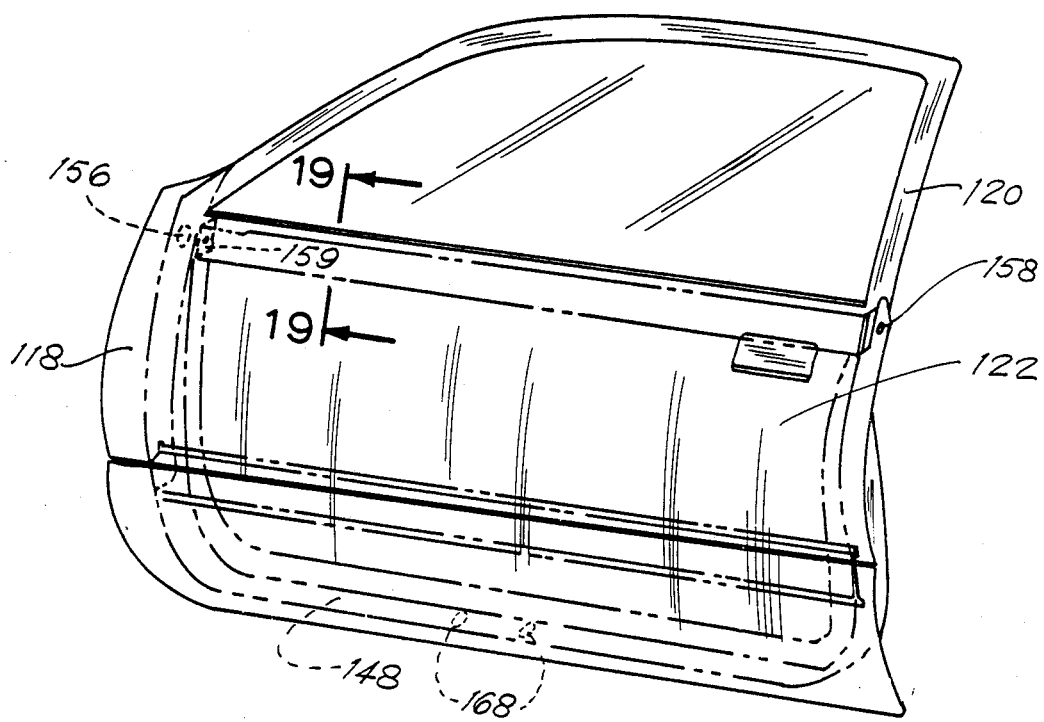
FIG. 18 is a perspective view, similar to FIG. 14, showing particularly structure for receiving the studs of FIG. 17.

The forward frame member 106 and rearward frame member 108 are channel shaped to support a lower portion of a flexible seal 112. The seal 112 has an inner surface 114 for supporting a substantial portion of the periphery of a glass panel 116. The seal 112 also has an exterior surface 117 which is positionable within an upper channel 118 in an upper door frame 120 of an exterior door panel 122 (FIGS. 14, 18). The door panel includes an intrusion beam 123. In a convertible or other automotive model without an upper door frame 120, the seal 112 need not extend above the belt line cross member 102.

The cartridge 100 can also include a mirror support plate 124 affixed to the belt line cross member 102 and, where applicable, also affixed to the upper section of the forward frame member 106. A mirror assembly 126 is attached to the mirror support plate 124 through fastening means including studs 128 affixed to the plate 124 and threaded into the mirror assembly 126. Additional components affixed to the cartridge 100 include a power or manually driven regulator assembly 130, a latch 132, a lock mechanism 134 including a remote actuator 136, and a snap in electrical wiring harness 138. The intermediate frame member 110 functions as a guide channel for the regulator assembly 130. The harness 138 includes a main bundle multipin connector 152 and individual functional connectors 154 and is affixed to the belt line cross member 102 in conventional manner. Also shown in FIGS. 13 and 17 is an exterior handle 140 which is part of the cartridge 100.

Referring to FIG. 14, the exterior door panel 122 includes hinges 144 and a horse collar door frame 146 having a laterally extending lower sill section 148 and an upper belt line surface area 150. FIG. 15 shows outer trim elements 147 of the door panel 122 and FIG. 16 shows an interior trim panel 149.

As shown best in FIG. 18, the exterior door panel 122 includes a forward access hole 156 and a rearward stud receiving hole 158. A bracket 159, FIGS. 18, 19 and 20, attaches to the panel 122. The bracket 159 includes an open-ended 160. As shown best in FIG. 17, the cartridge 100 includes a front stud 162 and a rear stud 164 aligned along the belt line cross member 103. The front stud 162 is affixed to a beltline reinforcement bracket 166 (FIG. 20) which in turn is affixed to the belt line cross member 103. The bottom sill 148 of the door panel 122 includes elongated openings 168 which register with tapped holes 170 in the lower plate 142 of the frame member 110.

To install the functional door cartridge 100 into the exterior door panel 122, the cartridge is lifted into the panel 122. The front 162 and rear 164 studs are positioned so that the rear stud passes through the hole 158 and the front stud seats in the open-ended slot 160. In this manner, the entire assembly can be pivoted about the studs 162, 164 to align the frame members 106, 108 and the glass panel 116 with the upper door frame 120. The upper portions of the frame members 106, 108 are inserted into the upper frame 120, the glass lowered, and conventional fasteners (not shown) are inserted through the seal 112 and holes 107 into the upper frame 120.

The top portion of the seal 112 is fitted into the top of the upper frame and the window glass panel is run upwardly to seat the seal completely in the exterior door panel. Additional fasteners can then be inserted attaching the cartridge to the door panel, the fastening sequence moving generally from the top toward the bottom of the assembly. The fastening sequence is completed by fastening the lower plate 142 to the lower sill 148 through the registered holes 170 and 168 by means of bolt and nut or other conventional fasteners. Alternatively, the holes 170 can be replaced by studs which pass through the elongated openings 168 and which are fixed in place by nuts or other thread receiving means.

It will now be evident that the studs 162, 164 allow pivoting for proper alignment of the upper elements of the cartridge with the upper door panel and corresponding motion of the lower plate 142 relative to the bottom sill accommodated by the elongated holes 168.

It should be understood that the present invention has been described in connection with certain specific embodiments. Other modifications will become apparent to one skilled in the art upon studying the specification, drawings, and the claims.

We claim:

1. A functional door cartridge for insertion into a motor vehicle door panel, said door panel having a door length, a bottom sill and being interconnectable with an intrusion beam, said cartridge comprising:

a reticulated frame including a plurality of vertically spaced members each extending laterally generally the same length as said door length and a plurality of laterally spaced upright frame members, one of said upright frame members extending lower than all of the other of said upright frame members and having a bottom surface positionable contiguous said bottom sill;

means for pivotally attaching the uppermost one of said vertically spaced members to said door panel, said pivotal attaching means accommodating pivoting motion of said cartridge with respect to said door panel and corresponding motion of said bottom surface with respect to said sill;

means for fixedly attaching said bottom surface to said sill subsequent to said corresponding motion;

a window mounted within said reticulated frame for up and down movement;

a window regulator mounted to said reticulated frame for moving said window up and down; and a latch mechanism mounted to said reticulated frame for latching said cartridge and door panel in a closed position with respect to said motor vehicle.

2. The functional door cartridge of claim 1 wherein said automotive door panel includes an upper door frame having a window receiving perimeter and wherein two of said upright frame members each comprise channel shaped window guides, and further comprising a soft seal extending between said guides and sized for insertion into said window receiving perimeter of said upper door frame.

3. The functional door cartridge of claim 2 wherein said window guides extend upwardly above said uppermost member and are each insertable into a portion of said window receiving perimeter of said upper door frame.

4. The functional door cartridge of claim 1 wherein said means for attaching said bottom surface to said sill subsequent to motion of said bottom surface comprise a stud fixed to said bottom surface and an enlarged receiving opening of said sill.

5. A functional door cartridge for insertion into an automotive vehicle door panel, said door panel having an intrusion beam, laterally spaced supports for attachment of said cartridge, and a bottom sill, said cartridge comprising:

a skeletal frame including a pair of vertically spaced members, the upper one of said members extending laterally between said spaced supports and including means for attaching said upper member to said spaced supports, said attaching means allowing pivoting motion of said skeletal frame with respect to said door panel prior to fixed attachment of said frame to said door panel, said frame further including three laterally spaced upright frame members, the two outermost of said upright members each including window guide channels and the central one of said upright members extending downwardly a distance below said two outermost members and including a bottom section contiguous with said bottom sill and slidable with respect to said sill for insertion and positioning of said central member upon pivoting motion of said skeletal frame, said central member including means for fixedly attaching said central member to said sill;

a window mounted within said guide channels for up and down movement; and a window regulator mounted to said skeletal frame for moving said window up and down.

* * * * *